(12) United States Patent
Matsumoto et al.

(10) Patent No.: US 6,295,305 B1
(45) Date of Patent: Sep. 25, 2001

(54) SECOND HARMONIC, SINGLE-MODE LASER

(75) Inventors: Hironari Matsumoto; Masayoshi Sato; Satoshi Makio; Hidenobu Ishida; Akio Miyamoto, all of Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/352,823

(22) Filed: Jul. 13, 1999

(30) Foreign Application Priority Data

Jul. 13, 1998 (JP) .................................................. 10-197837
Jul. 14, 1998 (JP) .................................................. 10-198710

(51) Int. Cl.⁷ .................................................. H01S 3/098
(52) U.S. Cl. .................................. 372/19; 372/22; 372/98
(58) Field of Search ................................ 372/22, 98, 6

(56) References Cited

U.S. PATENT DOCUMENTS 5,627,849 * 5/1997 Baer ........................................ 372/92
5,657,341   8/1997 Hyuga .
6,047,010 * 4/2000 Makio et al. ........................... 372/22

FOREIGN PATENT DOCUMENTS

09307160 A   11/1997 (JP) .
WO 97/21259  12/1997 (JP) .

* cited by examiner

*Primary Examiner*—Leon Scott, Jr.
(74) *Attorney, Agent, or Firm*—Finnegan, Henderson, Farabow, Garrett, & Dunner, L.L.P.

(57) ABSTRACT

In a second harmonic, single-mode laser having a resonator including a Cr-doped fluoride laser crystal, first and second wavelength-selecting elements and a nonlinear optical crystal between a pair of laser mirrors, a wavelength-selecting width of the first wavelength-selecting element is 1/30 or less of that of the second wavelength-selecting element, the first wavelength-selecting element is provided with a reflection coating having a reflectivity of 10–30% to the oscillated laser beam, such that the wavelength selection width of the first wavelength-selecting element is 0.02–0.03 nm, a wavelength interval in the oscillation wavelength range of the first wavelength-selecting element is 0.8–1.3 nm, and a wavelength selection width of the second wavelength-selecting element is 1.0–1.6 nm.

13 Claims, 8 Drawing Sheets

SECOND HARMONIC, SINGLE-MODE LASER

FIELD OF THE INVENTION

The present invention relates to an internal resonance-type, second harmonic, single-mode laser comprising a nonlinear optical crystal inside a solid-state laser resonator comprising a Cr-doped fluoride laser crystal, particularly to an internal resonance-type, second harmonic, single-mode laser for stably generating single-mode oscillation.

PRIOR ART

Demand is mounting for small, high-power, short-wavelength lasers to increase the recording density of optical disks and the resolution of optical measurement devices, etc. One of the promising candidates for light sources for such lasers is a second harmonic generation (SHG) laser using a nonlinear optical crystal. Particularly promising is the excitation of an internal resonance-type SHG laser comprising a nonlinear optical crystal inside the laser resonator by a semiconductor laser, because of small size and high-power output. A laser comprising a Cr-doped fluoride laser crystal such as Cr:LiSAF ($Cr^{3+}$-containing $LiSrAlF_6$), Cr:LiCAF ($Cr^{3+}$-containing $LiCaAlF_6$), Cr:LiSGaF ($Cr^{3+}$-containing $LiSrGaF_6$), etc. and excited by a semiconductor laser can generate oscillation in a wide wavelength range. For instance, the oscillation wavelength of a Cr:LiSAF crystal is ranging from 780 nm to 1000 nm. Accordingly, an internal resonance-type SHG laser comprising a combination of the Cr:LiSAF crystal and the nonlinear optical crystal can generate output in as wide a short-wavelength range as 390–500 nm. To achieve phase matching of the nonlinear optical crystal from a wide range of wavelengths of the oscillated laser beam by the Cr:LiSAF crystal, a birefringent filter is disposed in the resonator to give loss to the oscillated wavelengths except for the desired wavelength to be selected (WO 97/21259).

Figure 2:
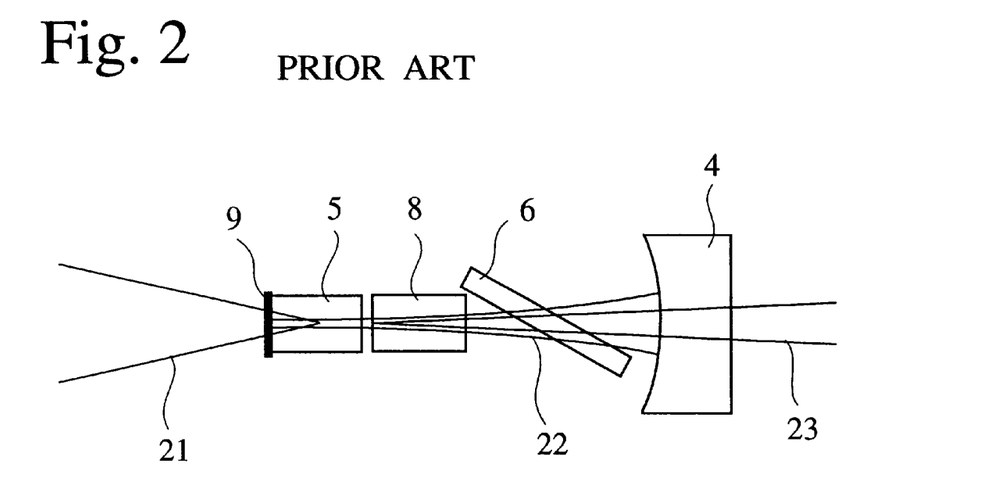
FIG. 2 is a schematic view showing a conventional laser.

FIG. 2 shows a typical example of the laser structure as disclosed by WO 97/21259. A coating mirror 9 formed on an input-side surface of the Cr:LiSAF crystal 5 and an output mirror 4 constitute a resonator, and an exciting laser beam 21 is supplied from an external exciting laser beam source to the resonator to cause the laser oscillation of the Cr:LiSAF crystal, which generates a laser beam 22 that is then converted to an SH beam 23 by a nonlinear optical crystal 8. In this case, the wavelengths of the laser beam 22 generated by the oscillation of the Cr:LiSAF crystal 5 are selected by a birefringent filter 6, to produce a laser beam that matches the phase-matching wavelength of the nonlinear optical crystal 8.

However, the wavelength selection by the birefringent filter 6 causes multi-mode oscillation because its wavelength selection width is wider than the longitudinal-mode interval of the resonator. If a fundamental wave is multi-mode oscillated in the internal resonance-type SHG laser, a mode-competing phenomenon takes place in the resonator, making unstable the SHG output at the time of wavelength conversion in the nonlinear optical crystal and causing noises called "SHG noises."

To suppress the SHG noises, it is effective to cause single-mode oscillation of the fundamental wave. Thus, Japanese Patent laid-Open No. 9-307160 proposed the insertion of an etalon into the resonator to make the fundamental wave narrower than the wavelength selection width of the birefringent filter, thereby causing oscillation in only one resonator mode, namely a single-mode oscillation technique.

However, in a single-mode laser comprising a combination of the birefringent filter and the etalon in its resonator, optimum conditions such as wavelength selection width, wavelength interval etc. for good single-mode oscillation are not known, and thus an optimum operation range for single-mode oscillation cannot easily be found. Thus, stable single-mode oscillation cannot easily be obtained. Also, if the operation range of single-mode oscillation were widened, sufficient SH output would not be able to be obtained.

OBJECT AND SUMMARY OF INVENTION

Accordingly, an object of the present invention is to provide an internal resonance-type, second harmonic, single-mode laser comprising a laser crystal capable of oscillating in a wide wavelength range, which can stably produce high-power output.

The second harmonic, single-mode laser according to the present invention comprises a resonator comprising a Cr-doped fluoride laser crystal, first and second wavelength-selecting elements and a nonlinear optical crystal between a pair of laser mirrors, a wavelength-selecting width of the first wavelength-selecting element being 1/30 or less of that of the second wavelength-selecting element, whereby only one of wavelengths passing through the first wavelength-selecting element is oscillated, with the remaining wavelengths attenuated to a level that cannot maintain oscillation.

In a preferred embodiment of the present invention, the second harmonic, single-mode laser comprises a resonator comprising a Cr-doped fluoride laser crystal, first and second wavelength-selecting elements and a nonlinear optical crystal between a pair of laser mirrors, wherein a wavelength-selecting width of the first wavelength-selecting element is 1/30 or less of that of the second wavelength-selecting element; wherein the first wavelength-selecting element is provided with a reflection coating having a reflectivity of 10–3% to the oscillated laser beam supplied from the Cr-doped fluoride laser crystal, such that the wavelength selection width of the first wavelength-selecting element is 0.02–0.03 nm; wherein a wavelength interval in the oscillation wavelength range of the first wavelength-selecting element is 08–1.3 nm; and wherein a wavelength selection width of the second wavelength-selecting element is 1.0–1.6 nm.

PREFERRED EMBODIMENTS OF THE INVENTION

A solid-state laser comprising a Cr-doped fluoride laser crystal such as Cr:LiSAF is extremely sensitive to internal loss of the resonator. Accordingly, when a wavelength-selecting element disposed in the resonator has a transmissivity of less than 99.9%, the internal loss of the resonator is too high to maintain oscillation. Thus, the wavelength selection width of the wavelength-selecting element should be in a wavelength range in which the transmissivity is 99.9% or more.

Figure 13:
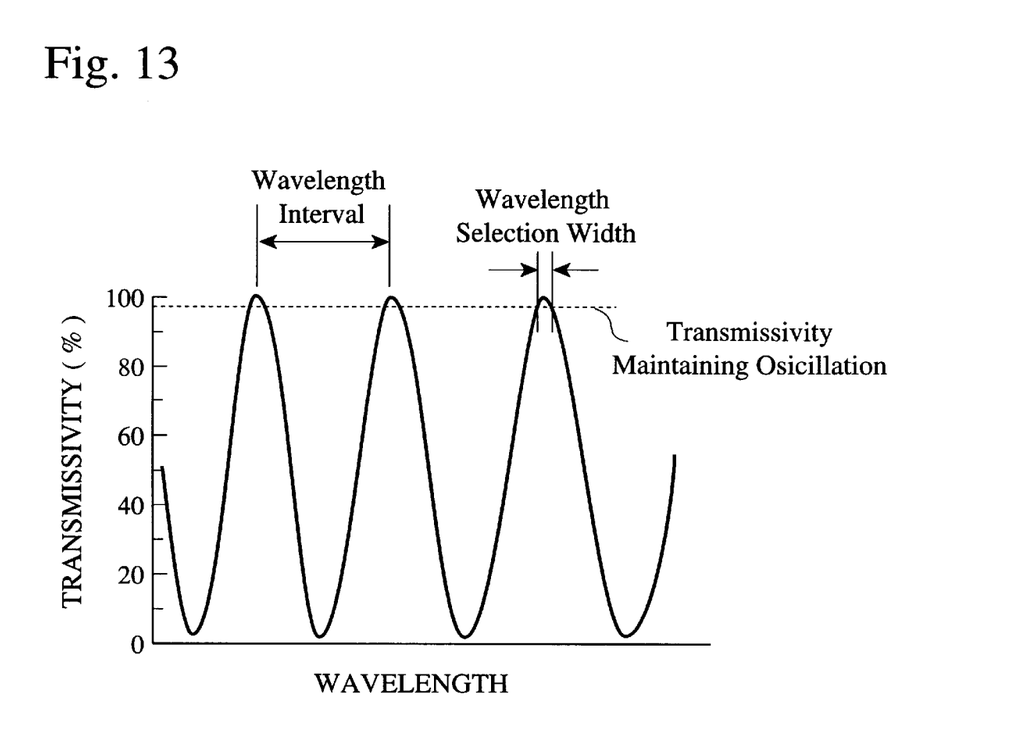
FIG. 13 is a graph showing the relation between transmissivity and wavelength in the wavelength-selecting element.

As shown in FIG. 13, in a case where a wavelength-selecting element is disposed in a resonator, the wavelength-selecting element has discrete high-transmissivity wavelength ranges called "wavelength election widths," in which there is substantially no loss. Thus, oscillation occurs only in the high-transmissivity wavelength ranges, while no oscillation takes place in wavelength ranges having less than 99.9% transmissivity. Usual laser mirrors have a reflection wavelength width of about 100 nm, and oscillation can occur at any wavelength in the 100-nm width when the wavelength-selecting element is not disposed in the resonator. Therefore, to convert a fundamental wave to an SH laser beam efficiently, laser oscillation should be caused only in the phase-matching wavelength of the nonlinear optical crystal.

Figure 12:
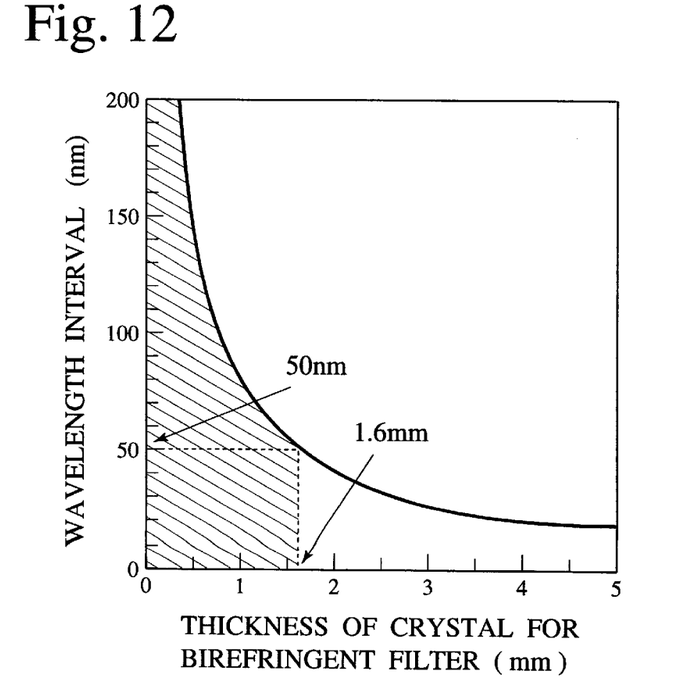
FIG. 12 is a graph showing the relation between the wavelength interval and the thickness of the second wavelength-selecting element.

FIG. 12 shows the relation between wavelength interval at which wavelength selection width appears and the thickness of a birefringent filter made of quartz as a second wavelength-selecting element. When a center of the reflection wavelength range of the laser mirror is selected as a phase-matching wavelength of the nonlinear optical crystal, the wavelength interval of the birefringent filter should be at least 50 nm to generate at least one wavelength in the 100-nm-wide reflection wavelength range of the laser mirror. It is thus clear from FIG. 12 that the birefringent filter should be as thin as 1.6 mm or less.

Figure 11:
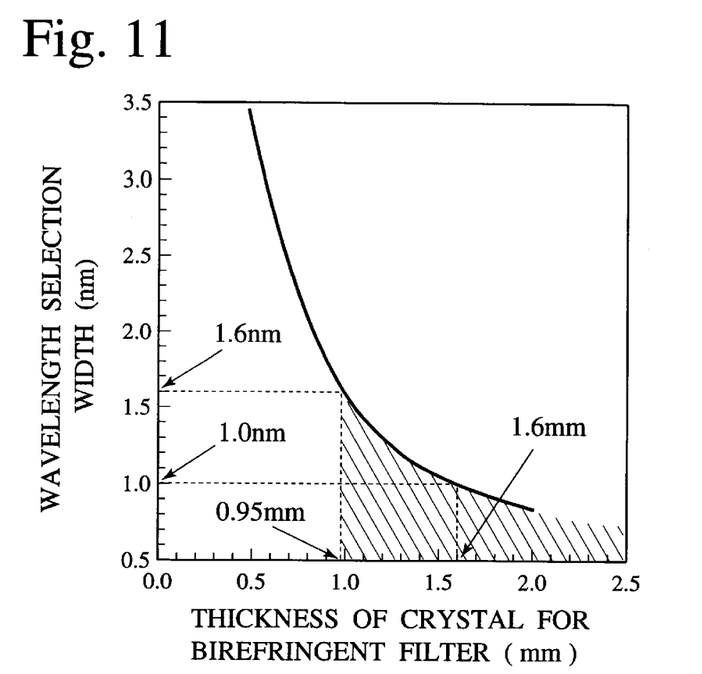
FIG. 11 is a graph showing the relation between the wavelength selection width and the thickness of the second wavelength-selecting element.

FIG. 11 shows the relation between wavelength selection width and the thickness of the birefringent filter. FIG. 11 indicates that the wavelength selection width should be 1.0 nm or more when the thickness of the birefringent filter is 1.6 mm or less. On the other hand, when the effective length of the resonator is 25 mm, the longitudinal-mode interval of the resonator is 0.016 nm by calculation. Thus, to achieve the single-mode oscillation, the wavelength selection width of the first wavelength-selecting element should be 0.032 nm or less.

As is clear from the above, when the second wavelength-selecting element such as the birefringent filter has a wavelength selection width of 1.0 nm or more, the first wavelength-selecting element such as an etalon should have a wavelength selection width of 0.032 nm or less to achieve the single-mode oscillation. Thus, when the wavelength selection width of the first wavelength-selecting element is as small as $1/30$ or less of that of the second wavelength-selecting element, only one desired longitudinal-mode wavelength can be oscillated in the wavelength selection range of the first wavelength-selecting element, while the other longitudinal-mode wavelengths are attenuated to a level that oscillation cannot be maintained by the first wavelength-selecting element, thereby providing effective single-mode oscillation.

The single-mode operation range of the first wavelength-selecting element can be widened by providing the first wavelength-selecting element with a coating layer for reflecting an oscillated laser beam emanating from the laser crystal. The reflection coating preferably has a reflectivity of 10–30% and a wavelength selection width of 0.020–0.03 nm. Also, the wavelength interval (hereinafter referred to as "etalon-mode interval"), at which the wavelength selection width of the first wavelength-selecting element appears, is preferably 0.8 nm or more, more preferably 0.8–1.3 nm.

Figure 3:
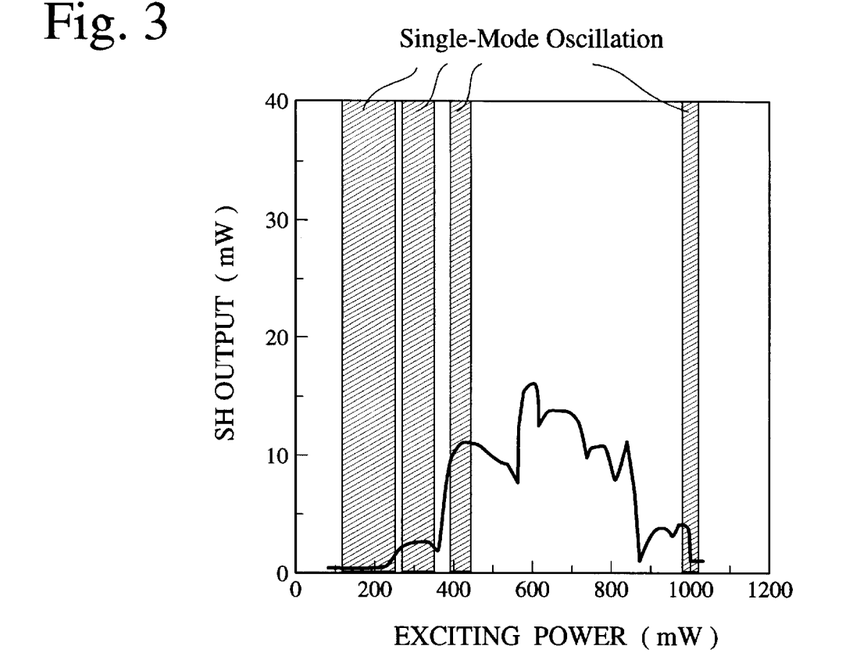
FIG. 3 is a graph showing the relation between SH output and exciting power in the case of no reflection coating on the first wavelength-selecting element according to the present invention.
Figure 4:
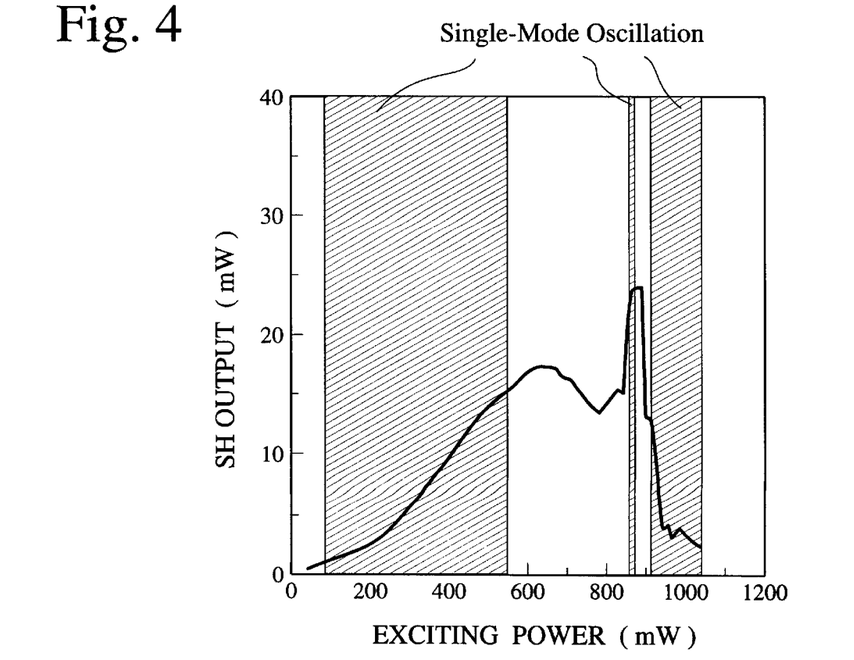
FIG. 4 is a graph showing the relation between SH output and exciting power in the case of a reflection coating of 10% reflectivity formed on the first wavelength-selecting element according to the present invention.
Figure 5:
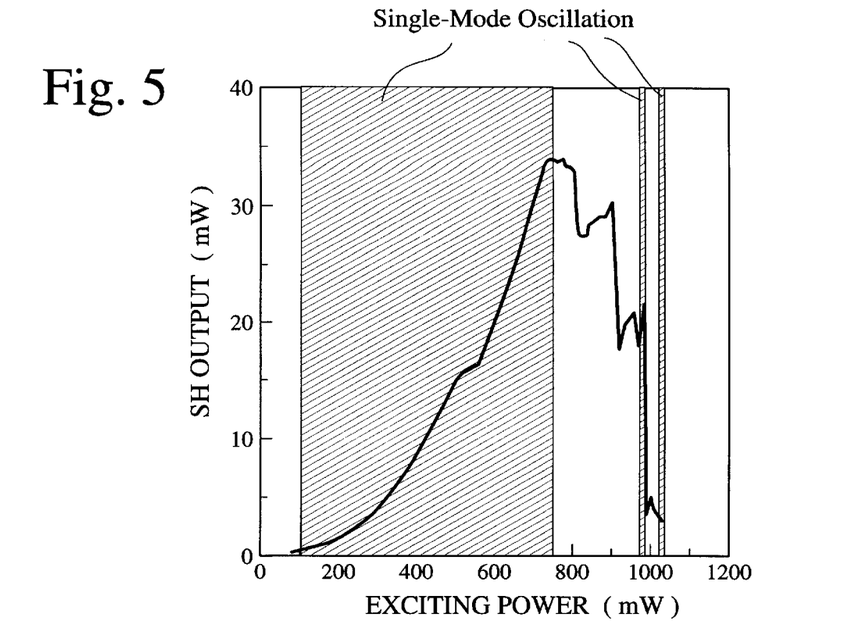
FIG. 5 is a graph showing the relation between SH output and exciting power in the case of a reflection coating of 20% reflectivity formed on the first wavelength-selecting element according to the present invention.
Figure 6:
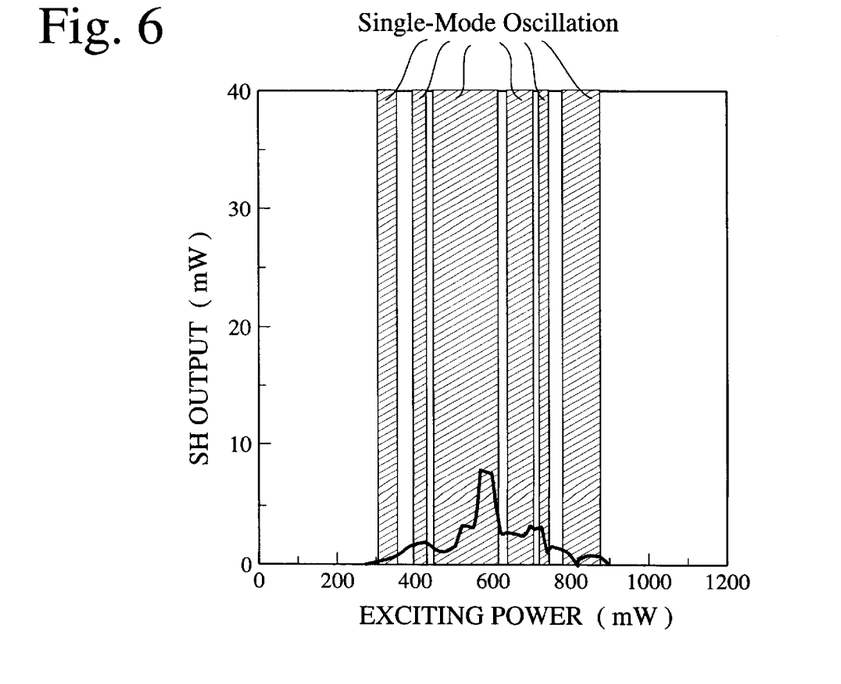
FIG. 6 is a graph showing the relation between SH output and exciting power in the case of a reflection coating of 40% reflectivity formed on the first wavelength-selecting element according to the present invention.

FIGS. 36 show the SH output characteristics relative to exciting power, when a 200-$\mu$m-thick solid etalon made of synthetic quartz is used as the first wavelength-selecting element. FIG. 3 is concerning no reflection coating (reflectivity of about 4%); FIG. 4 a reflection coating of 10% reflectivity; FIG. 5 a reflection coating of 20% reflectivity; and FIG. 6 a reflection coating of 40% reflectivity. In the case of no coating (reflectivity of about 4%), an exciting power range (hatched area in FIG. 3), in which the single-mode oscillation can be obtained, is narrow due to multi-mode oscillation, mode hopping, etc., and thus the single-mode oscillation is unstable with its control difficult. As the reflectivity increases to 10%, 20% and further, the exciting power range for allowing single-mode oscillation widens, and the output increases.

Figure 7:
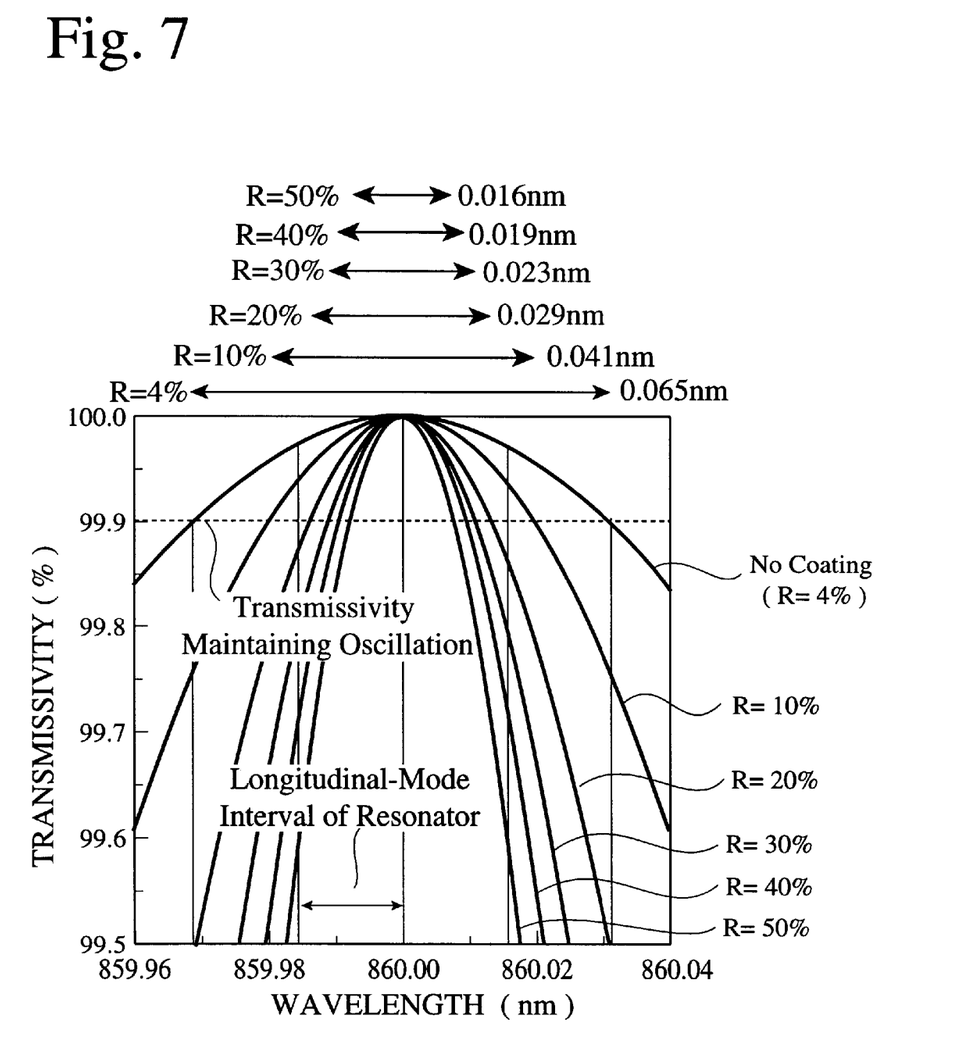
FIG. 7 is a graph showing the wavelength selection characteristics of the first wavelength-selecting element at various reflectivity of the reflection coating on the first wavelength-selecting element.

FIG. 7 shows the relation between the wavelength selection width and reflectivity of the etalon, together with the longitudinal-mode interval of the resonator. When the transmissivity of the etalon is less than 99.9%, the internal loss of the resonator is too high to maintain oscillation. Thus, the wavelength selection width of the etalon should be in a wavelength range in which the transmissivity is 99.9% or more.

As shown in FIG. 7, as the reflectivity increases, the wavelength selection width is narrowed, resulting in large loss in wavelengths outside the longitudinal-mode interval of the resonator. Thus, the wavelengths outside the resonator mode do not oscillate even if the exciting power is elevated, thereby widening the exciting power range for allowing single-mode oscillation, namely widening the single-mode operation range. However, when the reflectivity of the reflection coating is as high as 40%, even the slightest laser beam scattering at the reflection surface is amplified to large loss, resulting in drastically decreased output. Therefore, the preferred reflectivity of the reflection coating is 10–30%. Because the transmissivity of the etalon is preferably less than 99.9% in wavelengths outside the longitudinal-mode interval of the resonator, the reflection coating optimally meets the conditions that the reflectivity is 10–30%, and that the etalon has a wavelength selection width of 0.02–0.03 nm.

Figure 8:
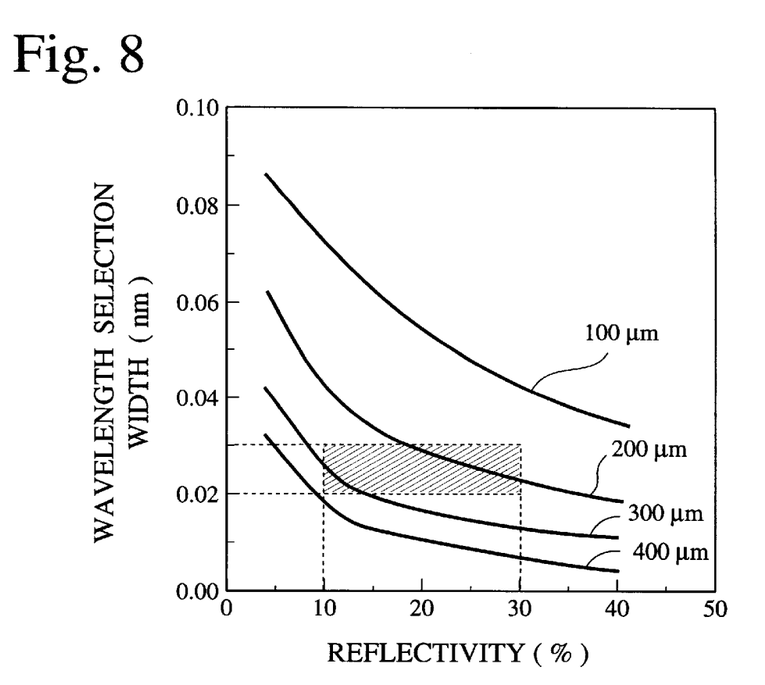
FIG. 8 is a graph showing the relation between wavelength selection width and reflectivity at various thickness of the first wavelength-selecting element.
Figure 9:
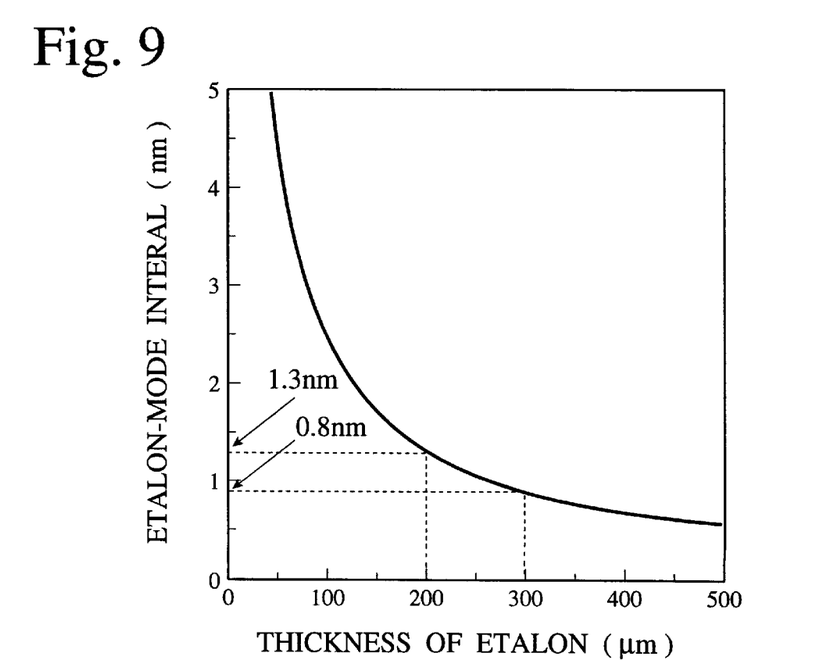
FIG. 9 is a graph showing the relation between an etalon-mode interval and the thickness of an etalon.

FIG. 8 shows the relation between reflectivity and wavelength selection width at various thickness of the etalon between 100 μm and 400 μm, and FIG. 9 shows the relation between the thickness of the etalon and the etalon-mode interval, a wavelength interval at which the wavelength selection width appears. The reflectivity of 10–30% and the wavelength selection width of 0.02–0.03 nm are simultaneously satisfied in a thickness range of 200–300 μm as indicated by the hatched portion in FIG. 8. In this case, the etalon-mode interval is 0.8–1.3 nm as shown in FIG. 9.

Figure 10:
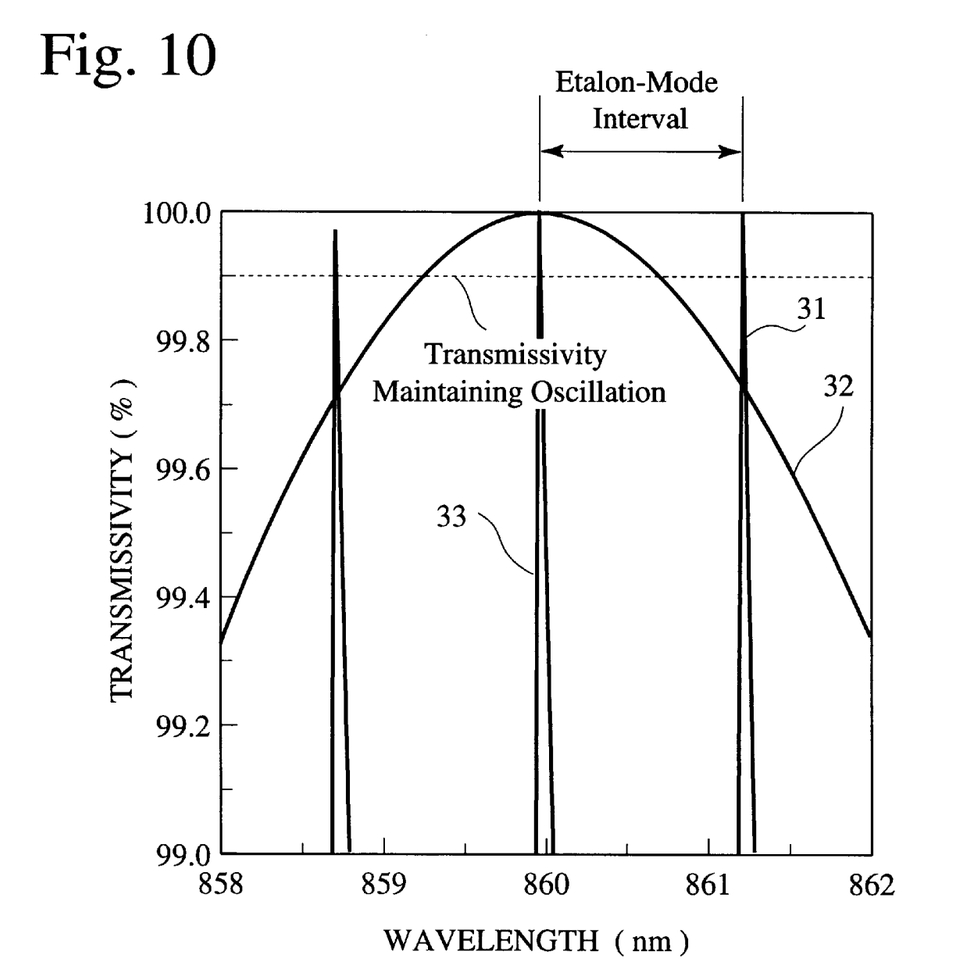
FIG. 10 is a graph showing the relation between transmissivity and wavelength, indicating the wavelength selection ranges of the first and second wavelength-selecting elements.

The wavelength selection width of the second wavelength conversion element is preferably less than 2 times that of the first wavelength-selecting element, specifically 1.0–1.6 nm. FIG. 10 shows the relation between wavelength and transmissivity when the etalon as the first wavelength-selecting element and the birefringent filter as the second wavelength-selecting element are simultaneously disposed in the resonator. The transmissivity 33 when both the etalon and the birefringent filter are disposed in the resonator is a product of the transmissivity 31 of the etalon and the transmissivity 32 of the birefringent filter. When only the birefringent filter is used, multi-mode oscillation takes place because the wavelength selection width of the birefringent filter is wider than the longitudinal-mode interval of the resonator. Because the wavelength selection width of the etalon is controlled as narrow as 1/50 or less of that of the birefringent filter, the inclusion of the etalon in the resonator in addition to the birefringent filter enables effective single-mode oscillation. However, because there are a plurality of wavelengths selected by the etalon at etalon-mode intervals, the birefringent filter should have a wavelength selection width less than 2 times the etalon-mode interval, so that only one of the wavelengths is selected by the wavelength selection width of the birefringent filter.

Figure 1:
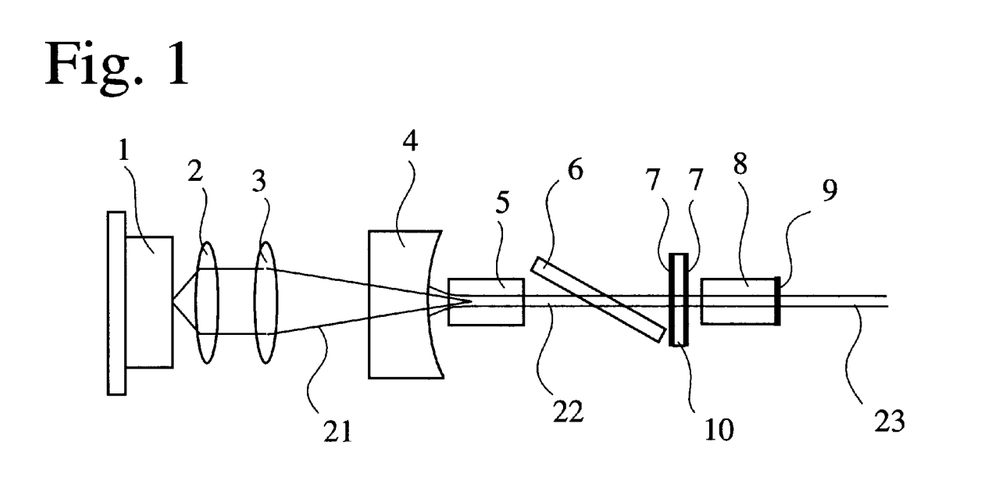
FIG. 1 is a schematic view showing the second harmonic, single-mode laser according to one embodiment of the present invention.

FIG. 11 shows the relation between the thickness of a crystal for the birefringent filter and the wavelength selection width, and FIG. 12 shows the relation between the thickness of a crystal for the birefringent filter and the wavelength interval at which the wavelength selection width appears. Because the etalon-mode interval is preferably 0.8–1.3 nm as described above, and because the wavelength selection width of the birefringent filter should be less than 2 times the etalon-mode interval, the wavelength selection width of the birefringent filter should be 1.6 nm or less (indicated by hatching in FIG. 11). Further, because a general laser mirror has a reflection wavelength width of about 100 nm, the wavelength interval at which the wavelength selection width of the birefringent filter appears should be 50 nm or more (indicated by hatching in FIG. 12). At this point, the wavelength selection width of the birefringent filter is 1.0 nm as shown in FIGS. 11 and 12. Thus, the optimum wavelength selection width of the birefringent filter is 1.0–1.6 nm The preferred embodiments of the present invention will further be explained below referring to the attached drawings FIG. 1 shows a second harmonic, single-mode laser according to an embodiment of the present invention. This second harmonic, single-mode laser is a kind of semiconductor laser-excited, solid-state laser, which comprises a semiconductor laser 1 for generating an exciting laser beam 21, a collimator lens 2 for turning the exciting laser beam 21 to a parallel beam, a focusing lens 3 for focusing the exciting laser beam 21, a laser mirror 4 disposed on the incident side of the resonator, a Cr:LiSAF crystal 5 containing 1.5% Cr as a solid-state laser crystal, a birefringent filter 6 as a second wavelength-selecting element, an etalon 10 as a first wavelength-selecting element, an LBO (LiB$_3$O$_3$) crystal 8 as a nonlinear optical crystal, and a coating mirror 9 formed on an output-side surface of the LBO crystal 8.

The semiconductor laser 1 may be an AlGaInP-type semiconductor laser available from SDL (Spectra Diode Lab.) having an output of 1 W and an oscillation wavelength of 670 nm. The Cr:LiSAF crystal 5 excited by the exciting laser beam 21 generates a laser beam 22, which is a fundamental wave in the resonator comprising the laser mirror 4 disposed on the incident side and the coating mirror 9 formed on the LBO crystal 8 on the output side. The laser mirror 4 is provided with a high-reflection (HR) coating, which allows 85% or more of the exciting laser beam 21 to pass through and reflects 99.9% or more of the fundamental wave 22. The Cr:LiSAF crystal 5 is provided with an anti-reflection (AR) coating, whose reflectivity is 5% or less both for the exciting laser beam 21 and the fundamental wave 22.

An output surface (rear surface) of the LBO crystal 8 is provided with an HR coating showing a reflectivity of 99.9% or more to the fundamental wavelength 22 and an AR coating 9 showing a reflectivity of 1% or less to the SHG wavelength. Also, a incident surface (front surface) of the LBO crystal 8 is provided with an AR coating having a reflectivity of 0.2% or less to the fundamental wavelength.

The present invention will be explained in further detail referring to the following Examples without intention of restricting it thereto.

EXAMPLE 1

The wavelength of a laser beam 22 oscillated in the resonator is controlled by the birefringent filter 6 and the etalon 10. The birefringent filter was constituted by a 1-mm-thick quartz plate controlled to produce such a fundamental wave that the conversion efficiency of the LBO crystal 8 is maximum. The etalon 10 was constituted by a 200-μm-thick synthetic quartz, each surface of which was provided with a reflection coating 7 having a reflectivity of 20% to the fundamental wave 22 to cause the single-mode oscillation of the oscillated laser beam emanating from the Cr:LiSAF crystal 5. The wavelength selection width of the etalon 10 was 0.029 nm, the etalon-mode interval was 1.28 nm, and the wavelength selection width of the birefringent filter was 1.54 nm. These values are within the preferred ranges of a reflectivity of 10–30% and a wavelength selection width of 0.02–0.03 nm for the etalon 10, an etalon-mode interval of 0.8–1.3 nm, and a wavelength selection width of 1.0–1.6 nm for the birefringent filter 6.

Under these conditions, the output characteristics of SHG to exciting power supplied from the semiconductor laser 1 to the Cr:LiSAF crystal 5 are as shown in FIG. 5. The exciting power width by which single-mode oscillation can be obtained (indicated by hatching in FIG. 5) was 650 mW, ranging from 100 mW to 750 mW (threshold level of laser oscillation of the Cr:LiSAF crystal 5), and the maximum output was 33 mW at the exciting power of 700 mW.

EXAMPLE 2

The wavelength of a laser beam 22 oscillated in the resonator is controlled by the birefringent filter 6 and the etalon 10. The birefringent filter was constituted by a 1.5-mm-thick quartz plate controlled to produce such a fundamental wave that the conversion efficiency of the LBO crystal 8 is maximum. The etalon 10 was constituted by a 200-μm-thick synthetic quartz, each surface of which was provided with a reflection coating 7 having a reflectivity of 20% to the fundamental wave 22 to cause the single-mode oscillation of laser beam oscillated by the Cr:LiSAF crystal 5. The wavelength selection width of the etalon 10 was 0.029 nm, the etalon-mode interval was 1.28 nm, and the wavelength selection width of the birefringent filter was 1.02 nm. These values are within the preferred ranges of a reflectivity of 10–30% and a wavelength selection width of 0.02–0.03 nm for the etalon 10, an etalon-mode interval of 0.8–1.3 nm, and a wavelength selection width of 1.0–1.6 nm for the birefringent filter 6.

Under such conditions, the output characteristics of SHG to exciting power supplied from the semiconductor laser 1 to the Cr:LiSAF crystal 5 showed similar tendency to those shown in FIG. 5. The exciting power width by which single-mode oscillation can be obtained (indicated by hatching in FIG. 5) was 720 mW, ranging from 100 mW to 820 mW (threshold level of laser oscillation of the Cr:LiSAF crystal 5), and the maximum output was 35 mW at the exciting power of 770 mW.

As described in detail above, the internal resonance-type, second harmonic, single-mode laser of the present invention comprising a laser crystal capable of being oscillated in a wide wavelength range can stably produce high-power single-mode oscillation with low noises. Because of such characteristics, the internal resonance-type, second harmonic, single-mode laser of the present invention can effectively be used in various applications such as laser disk systems, various measurement instrument, etc., which require high S/N ratios.

What is claimed is:

1. A second harmonic, single-mode laser comprising a resonator comprising a Cr-doped fluoride laser crystal, first and second wavelength-selecting elements and a nonlinear optical crystal between a pair of laser mirrors, wherein a wavelength selecting width of said first wavelength-selecting element is greater than 0 and less than or equal to ⅟30 of that of said second wavelength-selecting element, such that only one of wavelengths passing through said first wavelength-selecting element is oscillated, and the remaining wavelengths being attenuated to thereby provide single mode oscillation.

2. The second harmonic, single-mode laser according to claim 1, wherein said first wavelength-selecting element is provided with a reflection coating having a predetermined reflectivity to the oscillated laser beam supplied from said Cr-doped fluoride laser crystal, thereby widening the operation range of single-mode oscillation.

3. The second harmonic, single-mode laser according to claim 2, wherein said reflection coating formed on said first wavelength-selecting element has a reflectivity of 10–30% to the oscillated laser beam supplied from said Cr-doped fluoride laser crystal.

4. The second harmonic, single-mode laser according to claim 3, wherein a wavelength interval at which the wavelength selection width of said first wavelength-selecting element appears is 0.8 nm or more.

5. The second harmonic, single-mode laser according to claim 4, wherein the wavelength interval at which the wavelength selection width of said first wavelength-selecting element appears is 0.8–1.3 nm.

6. The second harmonic, single-mode laser according to claim 3, wherein said first wavelength-selecting element provided with a reflection coating having a reflectivity of 10–30% has a wavelength selection width of 0.03 nm or less.

7. The second harmonic, single-mode laser according to claim 4, wherein said first wavelength-selecting element provided with a reflection coating having a reflectivity of 10–30% has a wavelength selection width of 0.03 nm or less.

8. The second harmonic, single-mode laser according to claim 6, wherein said first wavelength-selecting element has a wavelength selection width of 0.02–0.03 nm.

9. The second harmonic, single-mode laser according to claim 7, wherein said first wavelength-selecting element has a wavelength selection width of 0.02–0.03 nm.

10. The second harmonic, single-mode laser according to claim 1, wherein the wavelength selection width of said second wavelength-selecting element is less than 2 times that of said first wavelength-selecting element.

11. The second harmonic, single-mode laser according to claim 10, wherein the wavelength selection width of said second wavelength-selecting element is 1.6 nm or less.

12. The second harmonic, single-mode laser according to claim 11, wherein the wavelength selection width of said second wavelength-selecting element is 1.0–1.6 nm.

13. A second harmonic, single-mode laser comprising a resonator comprising a Cr-doped fluoride laser crystal, first and second wavelength-selecting elements and a nonlinear optical crystal between a pair of laser mirrors, wherein a wavelength-selecting width of said first wavelength-selecting element is ⅟30 or less of that of said second wavelength-selecting element; wherein said first wavelength-selecting element is provided with a reflection coating having a reflectivity of 10–30% to the oscillated laser beam supplied from said Cr-doped fluoride laser crystal, such that the wavelength selection width of said first wavelength-selecting element is 0.02–0.03 nm; wherein a wavelength interval in the oscillation wavelength range of said first wavelength-selecting element is 0.8–1.3 nm; and wherein a wavelength selection width of said second wavelength-selecting element is 1.0–1.6 nm.

* * * * *